United States Patent Office 3,438,418
Patented Apr. 15, 1969

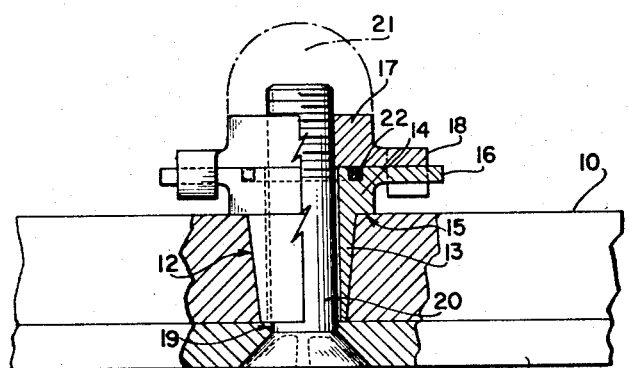
FIG_1
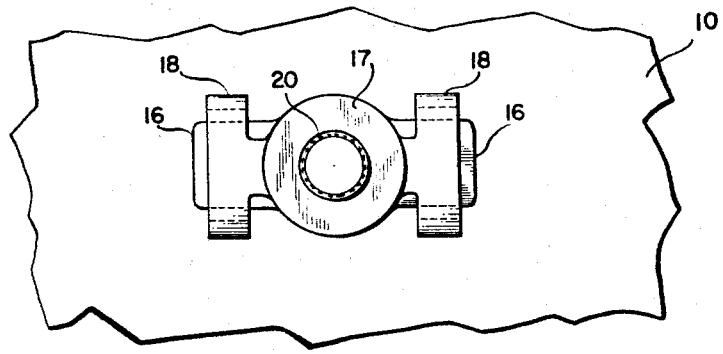
FIG_2
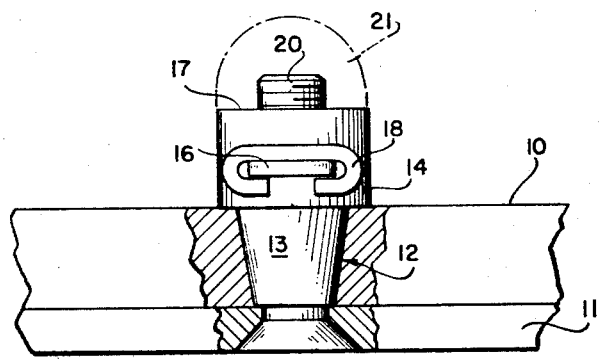
FIG_3

3,438,418
NUT ASSEMBLY FOR SELF-ALIGNING, REMOVABLE AND REUSABLE FASTENERS
Andrew N. Regas, Atlanta, Ga., assignor to Lockheed Aircraft Corporation, Burbank, Calif.
Filed Feb. 6, 1967, Ser. No. 614,090
Int. Cl. F16b *19/00, 1/00*
U.S. Cl. 151—41.73                                   4 Claims

ABSTRACT OF THE DISCLOSURE

A floating interference fit nut provides fatigue critical structure with residual stresses in the area around a hole therein and in which a screw is to be threaded whereby a member can be removably attached to such structure.

This invention relates broadly to fasteners of the self-aligning, removable and reusable type and more particularly to a nut assembly for such a fastener incorporating means by which it is mounted in interference fit with supporting structure, and thus mounted, designed and adapted to connect an associated member by means of and through a conventional bolt.

Self-aligning, removable and reusable fasteners employing floating nuts are well known, having been used extensively in inaccessible or "blind" applications. These fasteners generally comprise an assembly which includes oversized retainer means usually called a "cage" or "basket" secured to the blind side of a supporting member adjacent an aperture therein and a nut element mounted in, on, or to such retainer for predetermined relative universal movement. Thus, alignment of the threaded hole in the nut with the shank of a coacting screw or bolt element is facilitated, and also the nut is held against rotation as the bolt is tightened.

The interference fit concept is also well known to the fastener art where it has been employed to assure a rigid and/or maximum strength connection with respect to fatigue life. Such interference fit is usually facilitated through the use of a conical connecting element to thereby minimize precision gaging and elaborate equipment requirements in the installation thereof. To this end, the shank of a bolt has been tapered corresponding, and oversized with respect, to an aperture in the parts to be joined thereby or such other supporting structure. When installed, the bolt applies a uniform radial force in all directions on the surrounding structure and at every point in the length of its shank resulting in peripheral or hoop tension stresses.

The present invention contemplates drawing on this prior art knowledge in the construction and design of an improved fastener capable of satisfying applications for which there exists no present means within the known fasteners. For example, many applications require the mounting or attachment of a member to a fatigue critical structure, i.e., a structure fabricated of material requiring strengthening or residual stresses around holes if provided therein to accommodate an attached member. One such fatigue critical structure is the internal supporting structure for the thin sheet metal or skin that forms the outer cover of aircraft wings. This skin must be secured against separation from the underlying fatigue critical structure or beam while at the same time be permitted limited relative movement or slippage occasioned by flexing of the wing during normal flight.

In keeping with good engineering practices, these beams must be designed to weight/strength ratios that make them fatigue critical when pierced with apertures as required to accommodate fastening elements to secure the skin. Added complications arise inasmuch as it is also desirable, if not imperative, that removable fasteners be employed to permit separation and reconnection or replacement of the skin. With known fasteners and applying present day techniques, the necessary relative movement between skin and beam to permit flexing might be accomplished through a floating anchor nut connecting element. However, to also assure the necessary retention of skin to beam, torque forces applied to the bolt exceed those which the adjacent portions of the beam are capable of withstanding, and a failure invariably results under flexing loads. To prevent this through the use of a typical interference fit fastener is to produce a permanent connection wherein removal and reconnection or replacement is, for all practical purposes, impossible.

The present invention proposes to overcome the foregoing as well as other deficiencies in the present fastener art through the design of a fastener to include a nut assembly formed by a tapered bushing constructed and adapted for interference fit in a corresponding, undersized hole in the fatigue critical material. At its outer or larger end, this nut assembly includes a nut retaining element adapted to mount a nut for predetermined relative movement in all directions. The central aperture in both the bushing and nut retaining element is oversized with respect to the associated bolt that is intended to pass therethrough and coact with the nut in the usual manner. Preferably, the nut retaining element includes abutment means for coaction with the surface of the fatigue critical structure to limit and establish total insertion of the bushing therein.

With the foregoing design and nut assembly construction, initial insertion of the bushing in the undersized hole in the fatigue critical material and the resulting interference fit produces radial compressive stresses and a circumferential tensile stress therein. Subsequent loads applied by the connection of the associated member thereto upon tightening of the bolt are absorbed through the nut assembly and transferred into the fatigue critical structure through the interference bushing. At the same time, the floating nut permits the easy connection and disconnection of such associated member, and the oversized apertures in the bushing and nut retaining element permit limited relative movement between the fatigue critical structure and said member without a transfer of the accompanying forces thereacross.

With the above and other objects in view as will be apparent, this invention consists in the construction, combination and arrangement of parts all as hereinafter more particularly described, claimed, and illustrated in the accompanying drawing wherein:

FIGURE 1 is a side view partly in section and partly in elevation of a nut assembly constructed in accordance with the teachings hereof as it would be associated with a coacting bolt to interconnect, for example, a member such as the non-fatigue critical skin of an aircraft wing to the fatigue critical underlying supporting structure or beam, only a fragment of said skin and said beam being illustrated;

FIGURE 2 is a plan elevation taken from the top of the assembly shown in FIGURE 1; and FIGURE 3 is an elevation taken from the side of FIGURE 2 with parts of the aircraft skin and underlying beam broken away to reveal the entire nut assembly and the associated parts of the coacting bolt.

Referring with greater particularity to the drawing, 10 designates a fatigue critical structure, such as for example the underlying supporting structure or beam of an aircraft wing to be covered and enclosed by a sheet metal skin 11. In order to secure the skin 11 to the beam 10, the beam is pierced by an appropriate number of apertures one of which is illustrated at 12. Each such aperture 12 is tapered with the larger end thereof intended to be internally of the aircraft and adapted to receive a bushing 13 having a corresponding taper and which is oversized by a predetermined amount to require an interference fit when pressed or forced therein. At its inner or larger end, the bushing 13 terminates in an enlarged nut retaining element 14 whereby a step 15 is produced on the external surface thereof for abutment against the inner surface of the beam 10. Insertion of the bushing in the aperture 12 is thereby limited so as to be precisely coextensive therewith.

At its opposite end, the nut retaining element 14 terminates in, for example, a pair of laterally disposed ears 16 adapted to coact with a complemental pair of loops 18 extending laterally from a nut 17 mounted in flush abutment against the inner surface of the element 14. Each such loop 18 is oversized with respect to the associated ear 16 whereby it encloses it in spaced relation to provide limited relative movement in all directions, but at the same time retains the nut 17 assembled with the bushing 13.

When the nut assembly is thus secured to the structure 10 through interference fit of its bushing 13 in the aperture 12, it becomes for all intents and purposes an integral part of the structure 10. Until removed and replaced, this nut assembly constitutes a mount or fitting through which the skin 11 or other associated member is releasably connected to the structure 10. To this end, the skin 11 is pierced by an appropriate hole 19 for the passage of a screw or bolt 20 which is adapted to fit snugly therein. The diameter of the bolt 20, however, is less than that of the central passage through the bushing 13 and nut retaining element 14 by a predetermined amount determined by the required slippage between the structure 10 and skin 11 during flight or other operation of the aircraft.

Installation of the belt 20 into the nut 17 is facilitated by the relative mobility of the nut in its retainer 14. When such installation is accomplished and the bolt 20 fully torqued, the clamping forces thus applied prevent any separation between the beam 10 and skin 11. Moreover, these clamping forces are directed across the structure 10 through the bushing 13. At the same time, the skin 11 is free for relative movement or slippage on the beam 10 as established by the spacing of the shank of the bolt 20 from the bushing 13 and nut retaining element 14 and occasioned by flexing of the skin 11 during operation of the aircraft. If desired, appropriate sealing across the connection may be effected, as for example by a conventional dome 21 overlying and enclosing the end of the bolt 20 and/or an O-ring 22 operative between the adjacent surfaces of the retainer 14 and nut 17.

It is understood that while a particular embodiment of the invention has been herein shown and described, this is by way of illustration only and not definition. Numerous variations and modifications to this embodiment will suggest themselves to those skilled in the art without departing from the invention.

What is claimed is:

1. A nut assembly comprising a bushing having a tapered external surface and pierced by an axial hole, a nut retaining element connected to and carried by the larger end of said bushing with an axial hole in alignment with the bushing hole aforesaid, and a nut element mounted on said nut retaining element, said nut retaining element and said nut element including interengaging elements in spaced, overlapped relation for predetermined relative movement, the axial hole in said nut element being a predetermined amount smaller in diameter than, and at least partially aligned at all times with, the axial holes said bushing and said nut retaining element.

2. The nut assembly of claim 1 including sealing means operatively mounted and retained at all times between said nut and said nut retaining elements to thereby prevent fluid passage through said assembly.

3. The nut assembly of claim 1 including a shoulder defining said tapered external surface at the larger end thereof in spaced relation to the nut retaining element connection aforesaid, said shoulder having an annular face disposed substantially perpendicular to the longitudinal centerline of said nut assembly.

4. The nut assembly of claim 1 wherein aid nut retaining element terminates in a surface substantially perpendicular to the longitudinal centerline of said nut assembly and in substantially surface to surface contact with said nut element and includes diametrically opposed engaging elements complemental to coacting elements carried by said nut element.

References Cited

UNITED STATES PATENTS

| 2,544,304 | 3/1951 | Eckenbeck et al. | 151—41.73 |
| 2,986,244 | 5/1961 | Hutchison | 85—1 |
| 3,176,747 | 4/1965 | Nenzell | 151—41.7 |
| 3,177,916 | 4/1965 | Rosan | 151—41.73 |
| 3,020,947 | 2/1962 | McKelvey | 151—41.75 |
| 3,357,730 | 12/1967 | Siler | 151—47.76 |

EDWARD C. ALLEN, Primary Examiner.

U.S. Cl. X.R.

287—189.36